Sept. 20, 1971  R. C. PROGELHOF ET AL  3,605,490
HEAT SENSOR
Filed Dec. 5, 1969
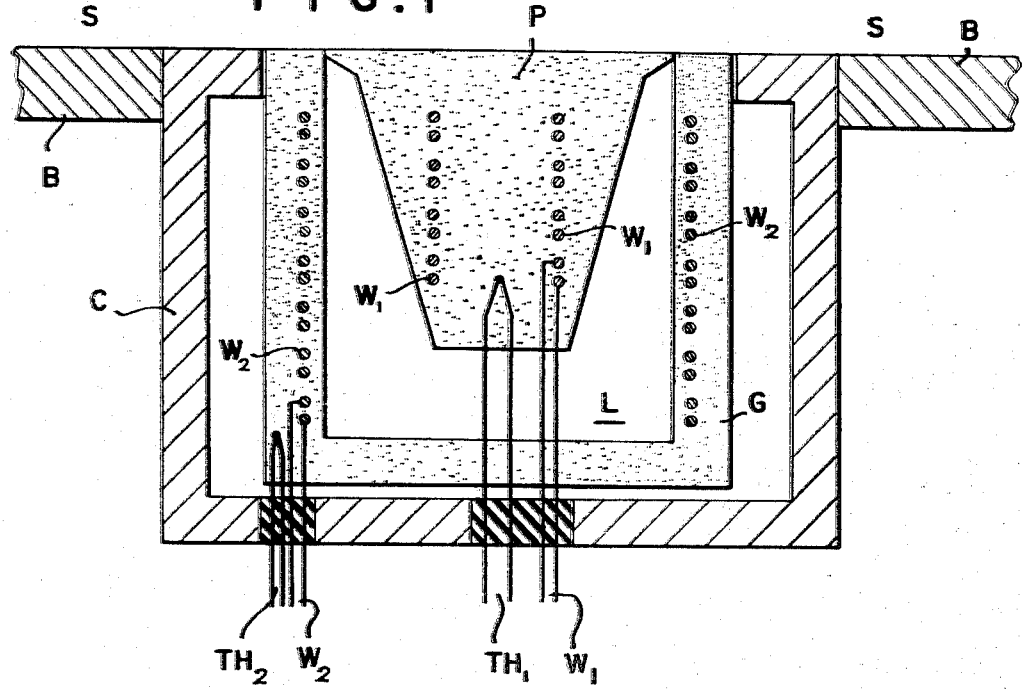
FIG. 1
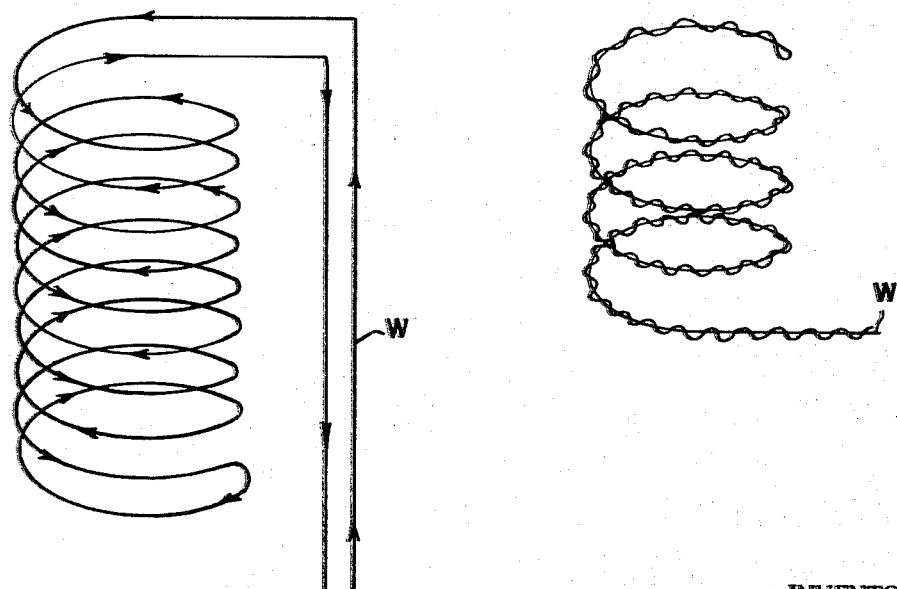
FIG. 2
FIG. 3
INVENTORS,
R. C. PROGELHOF
G. G. GOVESKY
BY
ATTORNEY United States Patent Office 3,605,490
Patented Sept. 20, 1971

3,605,490
HEAT SENSOR
Richard Carl Progelhof, Berkeley Heights, and Gerald George Govesky, Elizabeth, N.J., assignors to American Standard Inc., New York, N.Y.
Filed Dec. 5, 1969, Ser. No. 882,795
Int. Cl. G01k 17/00
U.S. Cl. 73—190H          8 Claims

ABSTRACT OF THE DISCLOSURE

Covers a heat flux probe for observing or measuring the rate at which heat is dissipated to an external body or space. The probe includes two spaced units and a non-conductive case which confines both units except a face of one of the units which is to be exposed to the external body or space. Heat is supplied to both units so as to hold them continually at the same temperature.

---

This invention relates to heat flux probes and calorimeters and like equipments for measuring the rate of heat transfer. More particularly, this invention relates to such equipments which are particularly adapted for sensing the rate of heat transfer from a body or wall member or other discontinuity into a surrounding or adjacent atmosphere.

The equipment of this invention is particularly suited for determining or measuring the rate at which heat is transferred from a particular body to the space adjacent to the body or from one body to another body. For example, the equipment of this invention may be used on, or may be adapted to be used with, a moving body, such as an aircraft or other moving vehicle, for determining the amount of heat which is convected from the aircraft, or from the wing of the aircraft, or from any vehicle, into the space in which the aircraft or vehicle is moving. This invention may also be used, for example, for determining the changes in the amount of heat transferred into space as the speed of the moving body, namely, the aircraft, is traveling through the surrounding space either when the speed is maintained constant or is rising or falling.

This invention will be better understood from the more detailed description and explanation hereinafter following when read in connection with the accompanying drawing in which FIG. 1 illustrates a lateral cross sectional view of one form of heat measuring equipment for determining the heat dissipation from one body to another or to the adjoining space; and FIGS. 2 and 3 illustrate two different coil formations for supplying heat to two units of the invention.

Referring to the drawing, a form of heat flux probe or calorimeter or like measuring apparatus is shown as including three main or general components, a plug or sensor P, a guard G and a casing C. The structure may be inserted as a composite unit into a wall B which may be, for example, the wall of an aircraft or the wing of an aircraft or the wall of any moving body. The plug P may be frusto-conical in shape as shown and it has a current-carrying heat coil W1 embedded therein along with a thermocouple TH1. The coil W1 and the thermocouple TH1 are both held fixed in place by a compound such as a lead-tin mixture, or by any other metal or compound which, while it may be conductive, is insulated from the coil W1 and from the thermocouple TH1 by any well-known means. These units W1 and TH1 are preferably protected against short-circuits by an insulating coating. The guard G, into which the plug P is inserted, may be concentrically arranged with respect to the plug P, and plug P is also concentrically arranged with respect to an outer casing or housing C. The guard G includes and supports a current-carrying heat winding or coil W2 along with another thermocouple TH2, both of which are embedded in a suitable compound similar to the conductive compound used in the plug P. The case C, however, is preferably made of a material which has low heat conductivity, such as any suitable phenolic substance, to resist, and as thoroughly as possible impede, the transfer of heat therethrough.

The composite structure including plug P, the guard G and the case C is positioned as a unit within the wall structure B, somewhat as shown, adjacent to the outer space S which may be any gas or air or fluid or other medium. The current carrying composite structure, sometimes called a calorimeter, may be employed to determine the convection transfer coefficient of the wall or body B by measuring the rate at which heat is dissipated into the adjoining space by the composite structure. One object of this invention is to determine the amount of electrical power that must be supplied to the composite structure to maintain it at a predetermined temperature as the structure moves through the medium.

The two coils W1 and W2 are respectively connected to a suitable source of voltage so that the respective currents will traverse the coils at rates which will yield substantially equal temperatures within the plug P and guard G which house the coils. By properly adjusting the currents supplied to the coils W1 and W2, the temperatures as measured by the thermocouples TH1 and TH2, respectively, will be substantially equal, if not exactly equal. It is important to maintain the temperatures of both units P and G at around the same or substantially the same value. This can be accomplished by means of separate potentiometers which interconnect the respective coils with the source of voltage. Each potentiometer may be adjusted, either by hand or by automatic means, to respond to any changes in the temperatures of the two thermocouples so that the currents supplied to the coils W1 and W2 will maintain the temperatures of the plug P and guard G substantially equal in value at all times.

In accordance with this invention, although the temperatures of the elements P and G are held substantially at the same temperature, their common temperature, however, should be maintained higher than that of the adjoining space S so that the energy will be directed toward the space S. By maintaining the temperatures of the units P and G alike, there will be substantially no relative flow of heat energy in either direction between the two units. Whatever variations in temperature occur due to the thermal conditions encountered in the atmosphere by the calorimeter will be promptly reflected in the changes in temperatures of the units P and G as indicated by the thermocouples TH1 and TH2. Because substantially no heat can be dissipated through the case C, all of the generated heat will be dissipated substantially entirely to the adjacent external atmosphere S.

The convective film coefficient $h_c$ of heat transfer from the calorimetric instrument to the space S adjoining the wall B may be determined from the following formula:

$$Q_c = h_c A_p (T_p - T_s)$$

In this formula, $Q_c$ designates the convective energy transferred, $A_p$ is the area of the plug P exposed to the outer space S, and $T_p$ and $T_s$ represent the temperatures of the plug P and the other space S, respectively. The quantity $Q_c$ will be equal to the difference between the energy (i.e. the product of the current and its voltage) fed into the coils W1 and W2 and the amount of radiant energy transferred to space S. The quantity of radiant energy may be designated $Q_r$. The dissipated radiant energy $Q_r$ may be estimated according to any standard or well-known formula.

The convective energy coefficient $h_c$ as determined mathematically from the above formulation will be characteristic of the particular body B while traveling in space S. It represents a significant numerical quantity and may be employed for comparing the convective energy coefficient of different bodies or regions to determine their relative efficiencies for heat transfer.

Although the plug P has been shown and described as of frustro-conical shape, it may be made of a cylindrical shape if desired.

Each of the coils W1 and W2 is preferably a bifilar winding. This is accomplished either by paralleling two resistive wires and winding them into a common helical form as shown in FIG. 2, or by wrapping the two wires around or about each other and into a helix as shown in FIG. 3. Such bifilar windings have the important property of producing equal and opposite electromagnetic fields which oppose each other due to the flow of opposing currents through the two windings of the helical structure. Each such bifilar winding will yield a magnetic field which is virtually a nullity or of a very small or insignificant magnitude. The operation of the thermocouples and the rest of the measuring equipment is improved by the use of bifilarly arranged windings W1 and W2.

The wires of coils W1 and W2 may be composed, for example, of a suitable gauge of constantan wire which is Teflon coated. The two electrodes of each thermocouple TH1 and TH2 may be made or iron and constantan, respectively, of suitable gauge, both Teflon coated and then wrapped in fiberglass.

When seeking the convective heat coefficient rating of a moving body, such as an airplane or train or other object, the surface of the object may be supplied with a plurality of such calorimetric instruments as that shown in the drawing, each inserted into the surface of the moving object, but with an appropriate spacing between the several instruments. The convection factors as so measured by the group of instruments will accurately portray the external conditions tending to generate heat under the varying conditions prevailing during the travel of the object through space S. The front surface of plug P is fully exposed to the external space S and acts as a funnel in transferring heat from the composite body to the space S.

Although the plug P, guard G and case C have been shown and described as of circular cross section, they may be made of elliptical, rectangular, square or other cross section in the practice of this invention. The composite body is constructed so as to maintain all of the components immovable with respect to each other. The composite body need not be movable; it may be stationary.

A copending application of R. C. Progelhoff, filed of even date and assigned to the same assignee, discloses a suitable form of arrangement of the plug component and its method of fabrication. Another copending application of R. C. Progelhoff and N. Z. Shilling discloses another form of heat probe or calorimeter.

While this invention has been shown and described in said particular arrangements merely for illustrated purposes, it will be understood that the general principles of this invention may be applied to other and widely varied organizations for the practice of this invention.

What is claimed is:

1. A system for measuring the rate at which heat is dissipated to an exterior surface, comprising two heated units which are spaced from each other by a predetermined gap and positioned so that one of the units has a side which is exposed to the exterior surface, means responsive to the temperature of said units for supplying heat to both units so that the temperatures of both units will be substantially the same to minimize thermal dissipation through said gap whereby the power necessary to maintain said units at said same temperature may be determined, and a housing of thermally non-conductive material encasing both units except for the side of one unit exposed to the exterior surface.

2. A system according to claim 1 in which each of the units includes a coil of wire carrying current to produce heat.

3. A system for measuring the rate at which heat is supplied to an exterior region, comprising a first unit having a predetermined surface exposed to the exterior region, a second unit which is spaced from the first unit and in which the first unit is nested, a heat insulated housing positioned around both units except said predetermined surface, means for supplying heat to both units so that the temperatures of both units are substantially the same, and means for observing the temperatures of both units whereby the power necessary to maintan said units at said same temperature may be determined.

4. A system according to claim 3 in which each of the units includes a coil of resistive wire which is supplied with current, and means for maintaining both units substantially at the same temperature.

5. A system according to claim 4 in which the housing consists of a case made of non-conductive material for housing both units except for the exposed predetermined surface.

6. A heat sensing system comprising a frusto-conical plug made of conductive material and having a surface exposed to a heat absorbing region, a guard made of conductive material which is spaced from the plug and in which the plug is nested, two current-carrying coils respectively unitized with the plug and the guard to supply heat thereto, means for housing and insulating both the plug and the guard but not the exposed surface, said housing means being made of thermally non-conductive material, and means responsive to the temperature of said units for supplying current to both coils so as to maintain the temperatures of the plug and the guard substantially equal to each other whereby the power necessary to maintain said units at said same temperature may be determined.

7. A heat sensing system according to claim 6 including two thermocouples which are respectively inserted into the plug and the guard for observing their respective temperatures.

8. A heat sensing system according to claim 6, in which the housing means is composed of a phenolic material.

References Cited

UNITED STATES PATENTS

| | | | |
|---|---|---|---|
| 3,142,170 | 7/1964 | Calhoun | 73—15 |
| 3,256,734 | 6/1966 | Storke, Jr. | 73—193 |
| 3,267,728 | 8/1966 | Solomons | 73—15 |
| 3,367,182 | 2/1968 | Baxter | 73—15 |

RICHARD C. QUEISSER, Primary Examiner

H. GOLDSTEIN, Assistant Examiner